Figure 1:
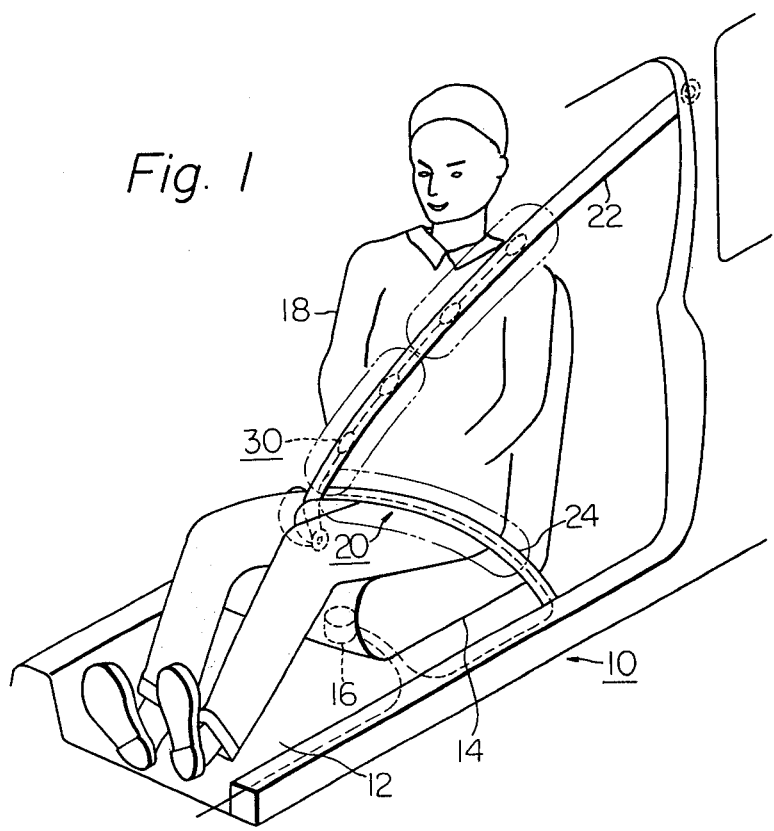

United States Patent [19]
Abe et al.

[11] 3,933,370
[45] Jan. 20, 1976

[54] EXPANSIBLE SEAT BELT FOR VEHICLES

[75] Inventors: Fumiyuki Abe, Yokohama; Syuichi Otani, Tokyo, both of Japan

[73] Assignee: Nissan Motor Co., Ltd., Yokohama, Japan

[22] Filed: Nov. 26, 1973

[21] Appl. No.: 418,839

[30] Foreign Application Priority Data
Nov. 27, 1972 Japan.................. 47-135420[U]

[52] U.S. Cl..................... 280/150 AB; 280/150 SB
[51] Int. Cl.².................................... B60R 21/08
[58] Field of Search .... 280/150 AB, 150 SB; 9/316, 9/335, 322

[56] References Cited
UNITED STATES PATENTS

| | | | |
|---|---|---|---|
| 1,701,927 | 2/1929 | Lange | 9/322 |
| 3,104,403 | 9/1963 | Lortz | 9/322 |
| 3,302,224 | 2/1967 | Boucher | 9/335 |
| 3,552,770 | 1/1971 | Berryman | 280/150 AB |
| 3,682,498 | 8/1972 | Rutzki | 280/150 AB |
| 3,778,083 | 12/1973 | Hamasaki | 280/150 AB |
| 3,791,670 | 2/1974 | Lucore et al. | 280/150 AB |
| 3,801,156 | 4/1974 | Granig | 280/150 AB |
| 3,837,671 | 9/1974 | Hamilton | 280/150 AB |
| 3,841,654 | 10/1974 | Lewis | 280/150 SB |

*Primary Examiner*—Leo Friaglia
*Assistant Examiner*—Terrance L. Siemens

[57] ABSTRACT

A vehicle occupant restraining belt which is expansible upon collision of the vehicle. An expansible belt section is formed of a resilient or extendible peripheral wall defining an elongate cavity. Gas producing means provided on the belt section supplies the cavity with pressurized gas to expand the peripheral wall.

1 Claim, 2 Drawing Figures

U.S. Patent  Jan. 20, 1976  3,933,370

EXPANSIBLE SEAT BELT FOR VEHICLES

The present invention relates generally to safety apparatus and more particularly to an occupant protecting seat belt system for use in vehicles such as automobiles, air planes, vessels and the like for restraining violent forward movement of the occupant resulting from collision at high speed.

Generally, an occupant restraining belt system includes shoulder and lap belts arranged to extend respectively across the chest and the lap of the seated occupant. The belt straps are at their terminal ends secured to relatively unyielding parts of the vehicle and confines the occupant in a restricted safety area in the event of a so-called "second collision." At this instant, when the occupant is thrown forward by inertia, his body stresses strongly the belt straps restraining the forward movement. The resultant local pressure exerted on his body is dangerous as it often produces serious internal injuries, particularly at the portions of his body engaging the side edges of the belts.

It is therefore a general object of this invention to provide an improved seat belt which overcomes the above fault.

Another object of this invention is to provide improved seat belts in which a portion of each belt member is expansible by pressurized fluid to disperse the pressure exerted by the occupant to an enlarged contact area of the belt.

Figure 2:
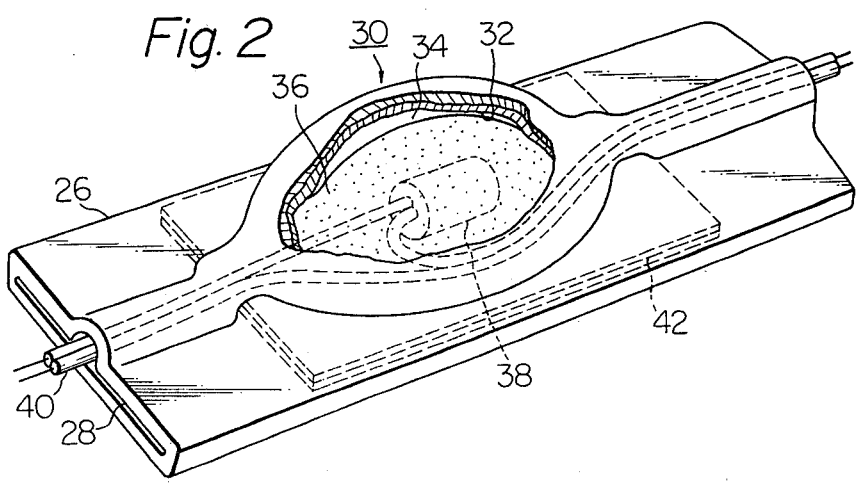

These and other objects and features of the invention will be readily apparent from the following detailed description taken in conjunction with the accompanying drawing, in which:

FIG. 1 is a general view of the interior of a vehicle showing a seated occupant with a seat belt according to the invention buckled up and expanded protective contact areas indicated by phantom lines; and FIG. 2 is a partially cut-away perspective view of a preferred example of a seat belt according to the present invention.

Referring to FIG. 1, a conventional interior of a vehicle body indicated at 10 includes a body floor 12 and a seat 14 mounted on the floor 12. The body 10 further accommodates a collision sensing apparatus 16 of any known type, preferably under the seat 14. A seat belt generally indicated at 20 comprises a shoulder strap 22 one end of which is fixed to a relatively unyielding, rearward portion of the body 10 and a lap strap 24 having the opposite ends secured to the floor. When an occupant 18 is seated as shown, the shoulder strap 22 is buckled up to extend from the lap strap diagonally across the chest of the occupant, while the lap strap 24 extends across his lap. The arrangement described above is already known, although the explanation thereof is necessary for clear understanding of the invention.

An embodiment of an improved seat belt according to the invention is now described in the succeeding paragraphs. As is apparent from FIG. 2, the illustrated shoulder and lap straps 22 and 24, at least at the sections contacting the body of the occupant, are made of a flattened tube 26 of resilient material. The interior of the belt or tube 26 defines an elongate cavity 28 therein. Supported on the belt section 26 is a plurality of gas producing means 30 at a certain distance apart. Each gas producing means 30 comprises a generally elliptical casing or capsule 32 defining a gas expansion chamber 34 which opens into the cavity 28. Contained in the chamber 34 is a chemical charge 36 which is ignitable to produce highly pressurized gas. An igniter assembly 38 is located in the chamber 34 in the midst of the chemical charge 36 and is electrically connected to the previously mentioned collision sensing apparatus 16 through insulated, flexible electrical wires 40. It is apparent that the portion of the belt devoid of cavity 28 sections is also formed with a path (no number) to receive the electrical wires 40. It is preferable to cover the capsule 32 with the same material as the belt for a good appearance. Furthermore, a reinforcing panel or sheet 42 is inserted between the capsule 32 and the belt 26 with a view to insulate both the belt and the occupant from the great heat generated in the chamber 34 upon activation of the gas producing means 30.

In normal driving of the vehicle, the above specified seat belt is exactly like any conventional belt system. However, as soon as a collision occurs, a signal produced at the collision sensing apparatus 16 is passed to the igniter assembly 38, whereupon the chemical charge 36 is fired. The instantaneous expansion of gases in chamber 34 causes pressurized gas to fill the cavity 28, expanding the belt section 26. The expanded contact area of the belt remarkably softens the momentum created by the occupant's body being thrown against the belt.

In lieu of a flattened, resilient tube of the embodiment above, a belt according to the invention may be composed of a collapsible or bellows-like member which is extendible toward the occupant in the described manner.

Although the foregoing description assumes the employment of a belt system of the type combining shoulder and lap belts, it would be readily understood that this invention applies to any other type of vehicle seat belt presently available.

The seat belt of this invention provides an increased protecting effect if used together with the so-called "safety air bag" in a high-speed vehicle, because the space between the occupant and the vehicle body is filled with the inflated bag and together with the belt almost immobilizes the torso of the occupant.

What is claimed is:

1. A safety device mounted on a vehicle having a body and a seat assembly, which comprises:
   means for producing an electric signal when said vehicle collides with an object;
   at least one occupant restraining seat belt mounted on said body and having therein at least two expansible sections in each of which a cavity extending along the length of said seat belt is formed;
   at least two gas generators mounted on said expansible sections for generating pressurized gas in response to said electric signal and for feeding the pressurized gas into said cavity so as to cause said expansible sections to expand, each of said gas generators including a casing mounted on each of said expansible belt sections and defining therein a chamber communicating with each of said cavities, an ignitable chemical charge filling said chamber, electro-conductive wires embedded in said belt for conveying said electric signal, and an ignitor assembly located within said chamber and connected to said wires to be responsive to said electric signal; and
   a reinforcing member of insulating material laid between said casing and said belt section.

* * * * *